INVENTOR.
THOMAS G. BROWN, JR.
BY
ATTORNEY

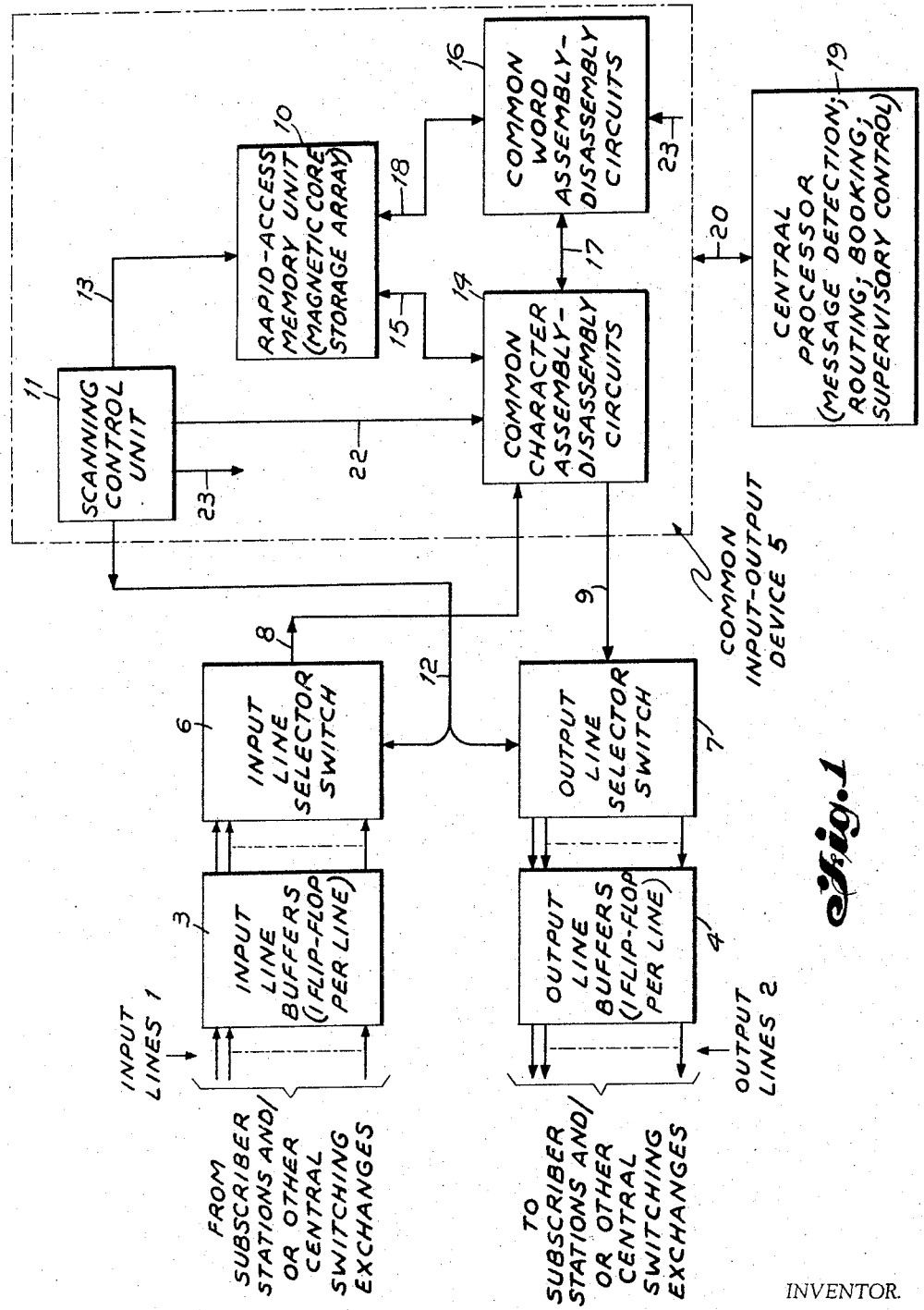

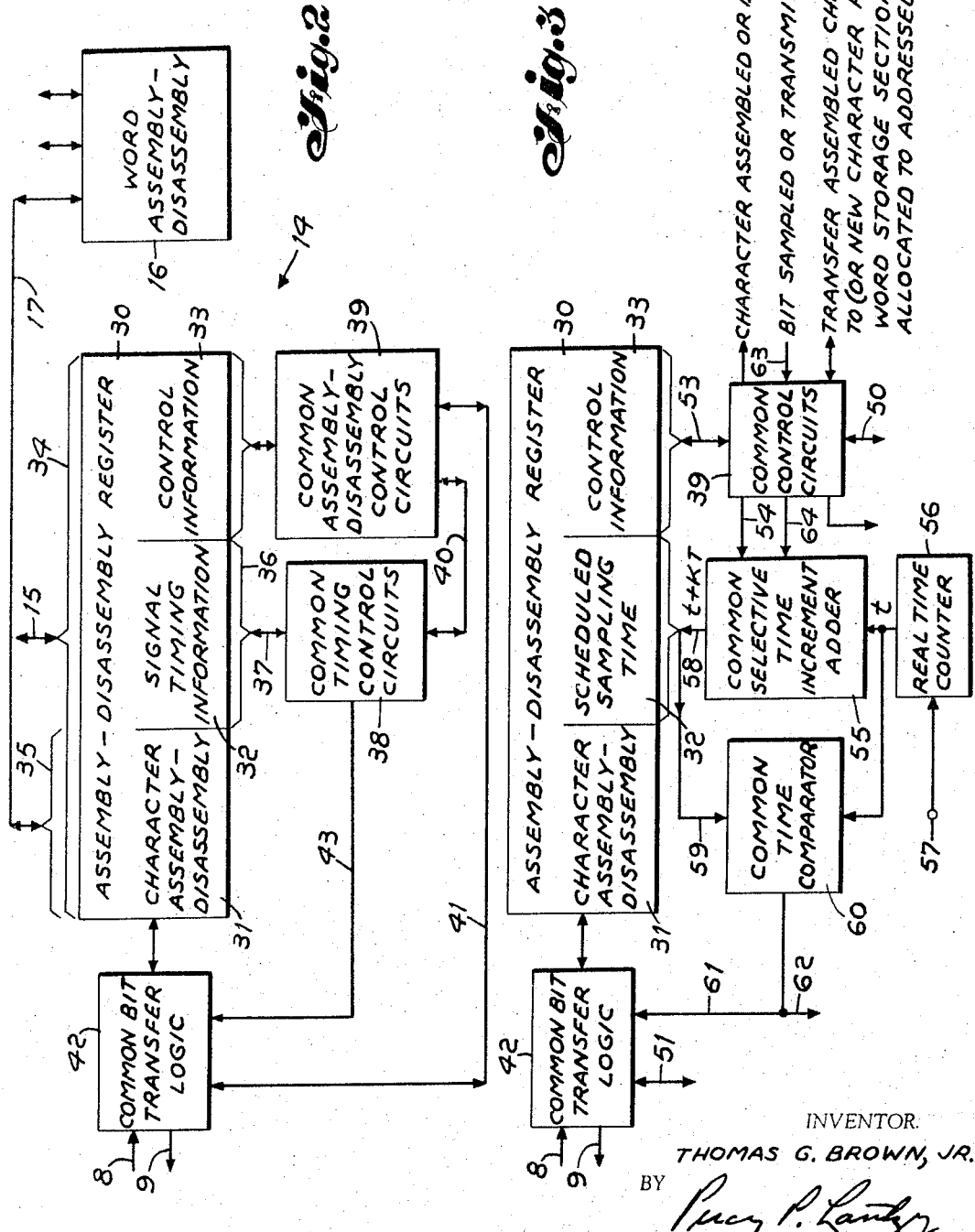

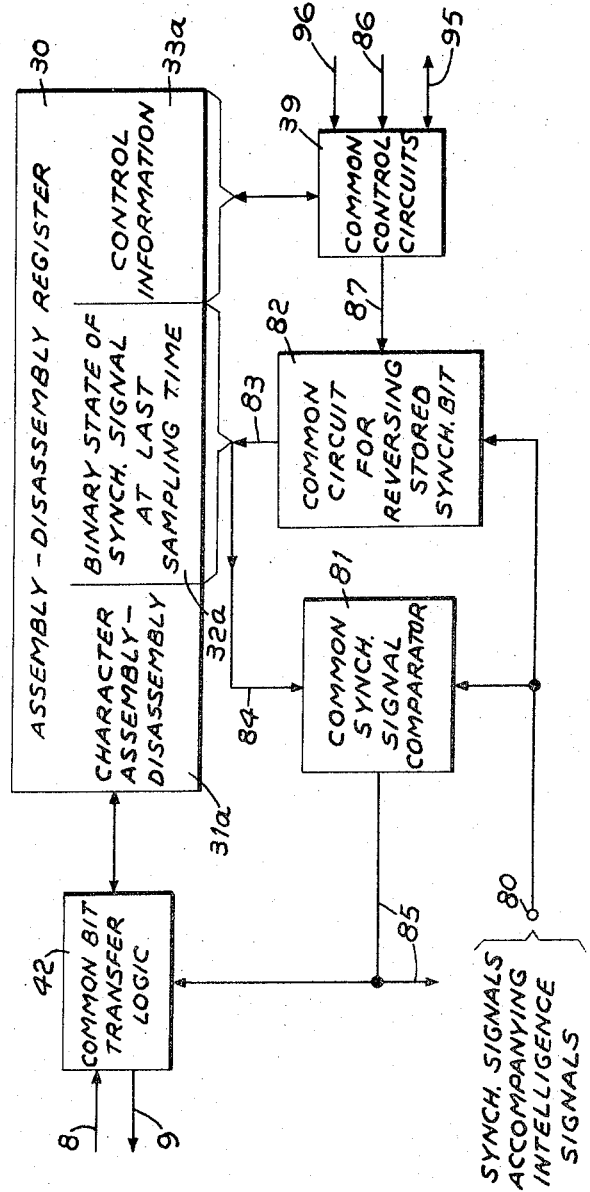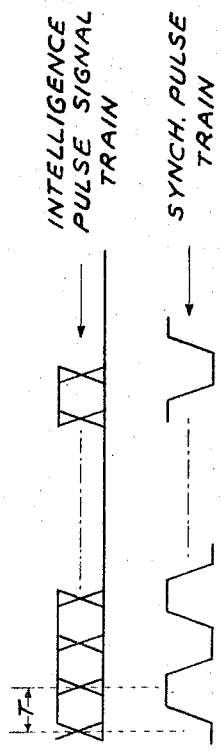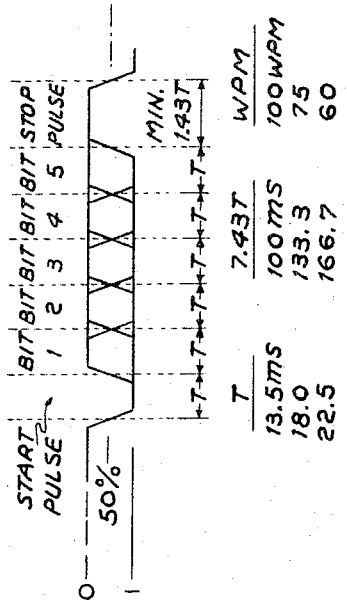

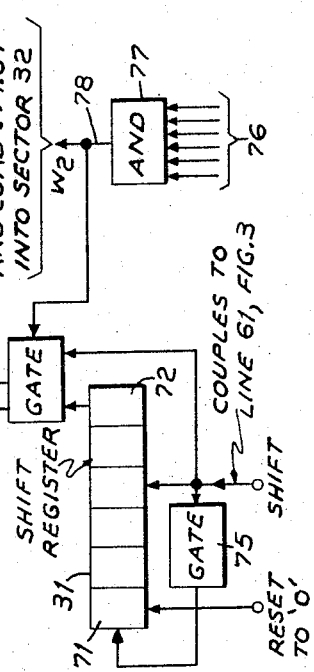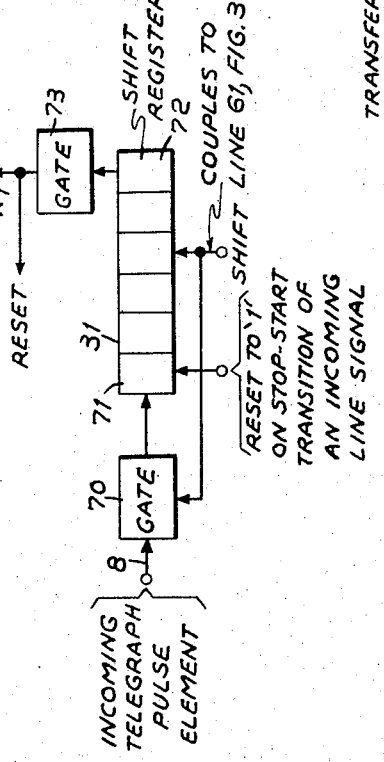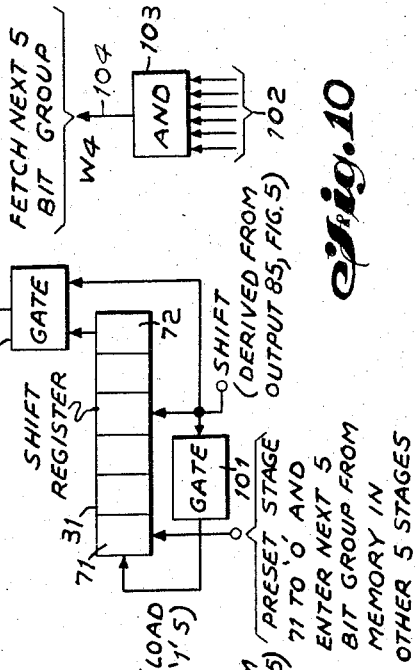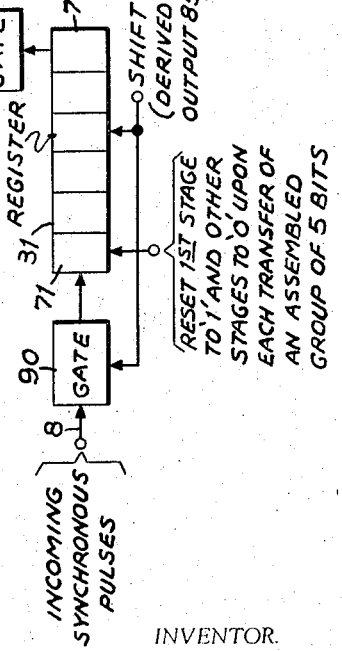

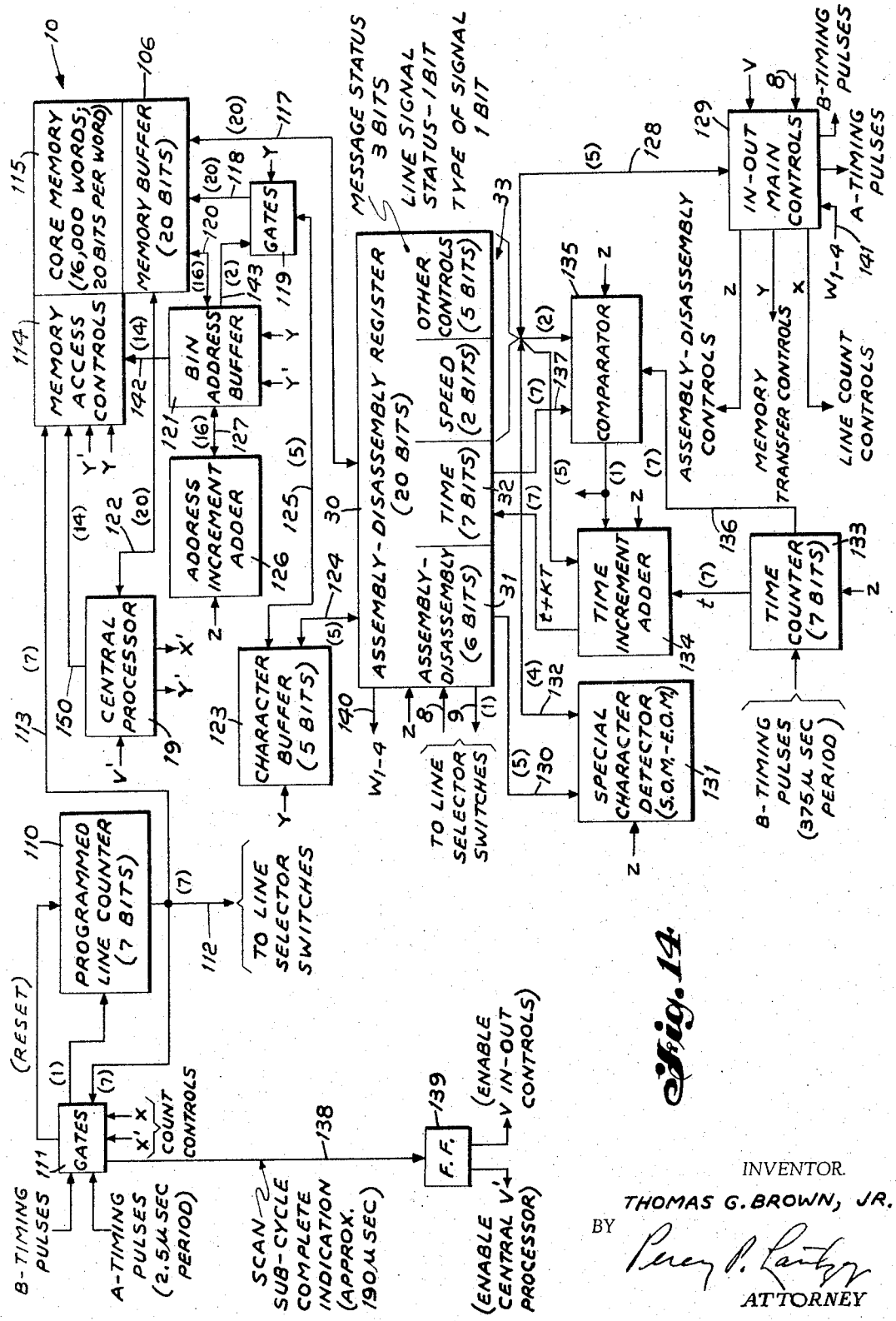

Fig. 15

| TYPE OF TRAFFIC | | NUMBER OF DUPLEX LINES (CAPACITY) $n$ | TRANSMISSION RATE |
|---|---|---|---|
| A | TELETYPE | $n_A = 96$ | 60, 75, AND/OR 100 WORDS PER MINUTE |
| B | SYNCHRONOUS | $n_B = 32$ | 2400 BITS PER SECOND |
| C | SYNCHRONOUS | $n_C = 64$ | 1200 BITS PER SECOND |
| D | SYNCHRONOUS | $n_D = 128$ | 600 BITS PER SECOND |
| E | COMBINATIONS OF TYPES A-D | $1/32 n_A + n_B + 1/2 n_C + 1/4 n_D \leq 32$ | 60, 75, AND/OR 100 WPM ON A; 2400 bps ON B; 1200 bps ON C; & 600 bps ON D |
| $E_1$ | EXAMPLE OF E | $n_A = 32; n_B = 16; n_D = 16$ | |
| $E_2$ | EXAMPLE OF E | $n_A = 16; n_B = 16; n_C = 12; n_D = 16$ | |

Fig. 16

| TYPE OF TRAFFIC | TRANSMISSION RATE | INFORMATION ELEMENT DURATION (SEC) | BASIC LINE SCAN PERIOD (SEC) | INFORMATION ELEMENT DURATION (SCAN CYCLES) |
|---|---|---|---|---|
| TELETYPE | 60 wpm | $22.5 \times 10^{-3}$ | $375 \times 10^{-6}$ | 60 |
| TELETYPE | 75 wpm | $18.0 \times 10^{-3}$ | | 48 |
| TELETYPE | 100 wpm | $13.5 \times 10^{-3}$ | | 36 |
| SYNCHRONOUS | 600 bps | $1.67 \times 10^{-3}$ | | 4.45 |
| SYNCHRONOUS | 1200 bps | $.83 \times 10^{-3}$ | | 2.22 |
| SYNCHRONOUS | 2400 bps | $.42 \times 10^{-3}$ | | 1.11 |

Fig. 17

SCANNING CYCLE SCHEDULES FOR ARRANGEMENT OF FIG. 15

| ITEM | TIME ALLOTTED (μ SEC) | | |
|---|---|---|---|
| A  SCAN 32 TYPE B (2400 bps SYNCHRONOUS) INPUT LINES AT 2.5 μ SEC/LINE | 80 | | ARRANGEMENT B OF FIG. 15 (32-2400 bps SYNCHRONOUS LINES) |
| B  TRANSFER AN AVERAGE OF 3 FULLY ASSEMBLED CHARACTERS TO ASSIGNED MESSAGE STORAGE BIN; 5 μ SEC/TRANSFER | 15* | | |
| C  SCAN 32 TYPE B OUTPUT LINES AT 2.5 μ SEC/LINE | 80 | | |
| D  TRANSFER AN AVERAGE OF 3 CHARACTERS FROM ASSIGNED MESSAGE STORAGE BIN TO CORRESPONDING ASSEMBLY-DISASSEMBLY MEMORY CELLS; 5 μ SEC/TRANSFER | 15* | | |
| E  CENTRAL PROCESSOR ACCESS TO MEMORY UNIT OF INPUT-OUTPUT DEVICE | 185* | | |
| TOTAL | 375 | | |
| A′  SCAN ALL 16 TYPE B DUPLEXED (INPUT AND OUTPUT) LINES AND 16 OF THE 32 TYPE A (TELETYPE) DUPLEXED LINES | 160 | 375 | ARRANGEMENT E₁ OF FIG. 15  32 DUPLEXED TELETYPE (TYPE A) LINES  16 DUPLEXED TYPE B SYNCHRONOUS LINES (2400 bps)  16 DUPLEXED TYPE D SYNCHRONOUS LINES (600 bps) |
| B′  TRANSFER AN AVERAGE OF 3 INCOMING AND 3 OUTGOING CHARACTERS | 30* | | |
| C′  CENTRAL PROCESSOR ACCESS TO MEMORY | 185* | | |
| A″  SCAN ALL 16 TYPE B LINES AND OTHER 16 TYPE A DUPLEXED LINES | 160 | 375 | |
| B″  TRANSFER AN AVERAGE OF 3 INCOMING AND 3 OUTGOING CHARACTERS | 30* | | |
| C″  CENTRAL PROCESSOR ACCESS TO MEMORY | 185* | | |
| A‴  SCAN ALL 16 TYPE B LINES AND ALL 16 DUPLEXED TYPE D (600 bps SYNCHRONOUS LINES) | 160 | 375 | |
| B‴  TRANSFER AN AVERAGE OF 3 INCOMING AND 3 OUTGOING CHARACTERS | 30* | | |
| C‴  CENTRAL PROCESSOR ACCESS TO MEMORY | 185* | | |
| TOTAL | 1125 = 3×375 | | |

* DENOTES AN AVERAGE ALLOTTED TIME (ABSENCE OF A * DENOTES FIXED TIME)

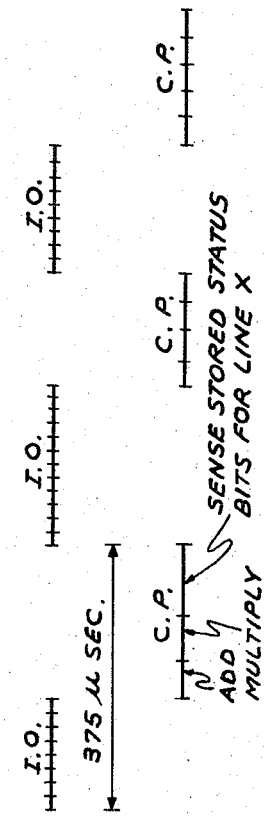

United States Patent Office

3,366,737
Patented Jan. 30, 1968

3,366,737
MESSAGE SWITCHING CENTER FOR ASYNCHRONOUS START-STOP TELEGRAPH CHANNELS
Thomas G. Brown, Jr., Ridgewood, N.J., assignor to International Telephone and Telegraph Corporation, Nutley, N.J., a corporation of Maryland
Filed Nov. 21, 1963, Ser. No. 325,313
12 Claims. (Cl. 178—53.1)

ABSTRACT OF THE DISCLOSURE

A pulse signal exchange system for handling binary pulses directly between a large scale magnetic core memory and a plurality of input and output transmission lines on a bit-by-bit multiplex basis.

---

This concerns a centralized pulse signal exchange facility for automatically and selectively conveying pulse information signals between a multiplicity of signaling lines.

In the design of presently known exchange facilities, it has hitherto been considered common practice to provide an individual character buffer unit per signaling line which is adapted to independently time the receipt or transmission of pulse signal elements in discrete character groups. Depending upon the system requirements such character buffer units may be adapted to gather and store each character group of pulse signal elements at one recurrence rate and to forward the same character elements at a different recurrence rate. This is necessary, for example, where teletype character signal elements recurring at a low line signaling frequency are to be transferred in serial form to a high speed serial access memory.

It is therefore quite apparent that in presently known systems serving a large number of signaling lines a considerable amount of per line hardware is required. Incidental to this, it is noted that the known systems are operating inefficiently and wastefully when less than a predetermined maximum number of lines are kept busy.

Accordingly, an object of this invention is to provide a more economical and efficient system for automatically exchanging pulse information signals between a multiplicity of signal lines.

Another object is to provide a more versatile, more economical, and more efficiently organized system for exchanging pulse information signals between a multiplicity of signal lines some of which may be operating at different signal element recurrence frequencies.

Still another object is to provide a centrally organized input-output device which is adapted to be shared among a large number of independent signal lines, and which is effective to carry pulse information signal elements or bits between the lines, without the aid of individual buffer line units capable of handling pluralities of the signal elements in groups.

Yet another object is to provide an input-output device which is adapted to convey pulse code signals between a multiplicity of independent lines on a bit-by-bit basis and which may be adapted to modify its handling of any one of the lines by a simple alteration of one or more bits of stored control information.

A system organized in accordance with the foregoing objects characteristically comprises a large number of signaling lines and a common input-output device which are interconnected either directly or through single signal element regenerators such as flip-flops. The common input-output device is characterized by the inclusion therein of a rapid access memory unit having an assembly-disassembly storage cell therein allocated to each line, a scanning control unit which is operative to cyclically address the lines and the corresponding assembly-disassembly storage cells in a predetermined multiplex scanning sequence of sufficiently short duration to reliably ensure addressing of the line having the highest characteristic signal element recurrence rate during each signal element interval thereon, and means operated in step with the scanning unit, and under the control of information stored in the assembly-disassembly storage cells, for selectively transferring a signal bit element between each addressed line and an appropriate bit storage position in the corresponding assembly-disassembly storage cell during a predetermined scanning cycle which is selectively determined by common timing circuits. This common device is thus capable of directly transferring the bits of a character signal group between any line and the corresponding assembly-disassembly storage cell without the aid of an individual buffer line unit and, therefore, without a separate character signal timing device and a separate character buffer register for each line, as required in previous buffer line units. When a complete character has been thus assembled in or transferred from a corresponding assembly-disassembly storage cell, certain control information stored in the same cell is altered atuomatically so as to thereafter exert automatic control over the transfer either of an assembled character to an associated word storage cell reserved for assembly of groups of message characters taken from a particular line under consideration or, respectively, to control the transfer of a next successive character from a word storage cell to the corresponding assembly-disassembly cell from which the bits are thereafter to be individually played out to an associated outgoing line.

By such means, entire messages are automatically taken off incoming lines on a bit-by-bit basis and assembled first into characters and then into words, and the words are further processed to accumulate message blocks or entire messages. Similarly the converse procedure, that required to transfer a stored message to an outgoing line on a bit-by-bit basis, is automatically carried out by means of a progressive disassembly of the message into successively smaller groupings within the memory storage areas reserved therefor.

The input-output device is coupled to a central processor which exerts supervisory control over the flow of messages between the signaling lines so that messages are appropriately routed between lines, and properly accounted for and checked during such routing. The operations of the central processor relative to the input-output device are timed so as not to interfere with the cyclic line scanning procedure carried out within the input-output device.

It is interesting to note that by virtue of the organization of the input-output device, as characterized above, the form and recurrence rate of the signals carried on any line may be varied and all that is required to adapt the input-output device is a simple variation of one or more control bits stored in the corresponding assembly-disassembly storage cell. In contrast, prior art buffer line units usually require extensive overhauling or replacement to accomplish the same result.

The foregoing and other objects and features of the invention will be more fully understood and appreciated upon consideration of the following detailed description of a system organized in accordance therewith, said description being intended to be read in conjunction with the accompanying drawings wherein:

FIGURE 1 is a general block diagram illustrative of the general organization of a system embodying the main principle of invention herein;

FIGURE 2 is a generalized block diagram, in slightly greater detail, of a portion of the system shown in FIGURE 1;

FIGURE 3 is a schematic block diagram of those portions of the sub-system of FIGURE 2 which are applicable to the handling of telegraph pulse signals in start-stop format;

FIGURE 4 is a timing diagram characterizing the timing of a start-stop telegraph pulse signal train;

FIGURE 5 is a block schematic of those portions of the system of FIGURE 2 which are applicable to the handling of synchronous data pulse trains in which the individual bits are accompanied by corresponding synchronizing pulses;

FIGURE 6 is a timing diagram illustrating the relative timing of a synchronous data pulse train and the corresponding synch pulses which accompany the data pulse elements;

FIGURE 7 is a schematic drawing of a ciruit useful for assembling an incoming start-stop pulse character within the register 30 of FIGURE 2;

FIGURE 8 is a schematic drawing of a circuit useful for disassembling an outgoing telegraph start-stop pulse character within the register circuit block 30 of FIGURE 2;

FIGURE 9 is a schematic drawing of a variation of the circuit of FIGURE 7 for use in assembling an incoming group of synchronous pulse data elements within the register 30 of FIGURE 2;

FIGURE 10 is a variant of the circuit shown schematically in FIGURE 8 which is useful for disassembling an outgoing group of synchronous pulse data elements within the register 30 of FIGURE 2;

FIGURE 14 is a detailed schematic drawing illustrating a particular embodiment of the apparatus generally illustrated in FIGURE 1;

FIGURE 15 is a chart illustrating the line handling capacity of the particular system shown in FIGURE 14 for various combinations of teletype and synchronous data pulse carrying lines, taking into consideration the signal transmission rates on the lines;

FIGURE 16 is a chart relating the durations of bit signal elements, for various line transmission rates, to the multiplexed scanning period of the line scanning apparatus shown in FIGURE 14;

FIGURE 17 is a chart illustrating the allotment of scanning time in the apparatus of FIGURE 14 for various combinations of signal traffic;

Figure 13:
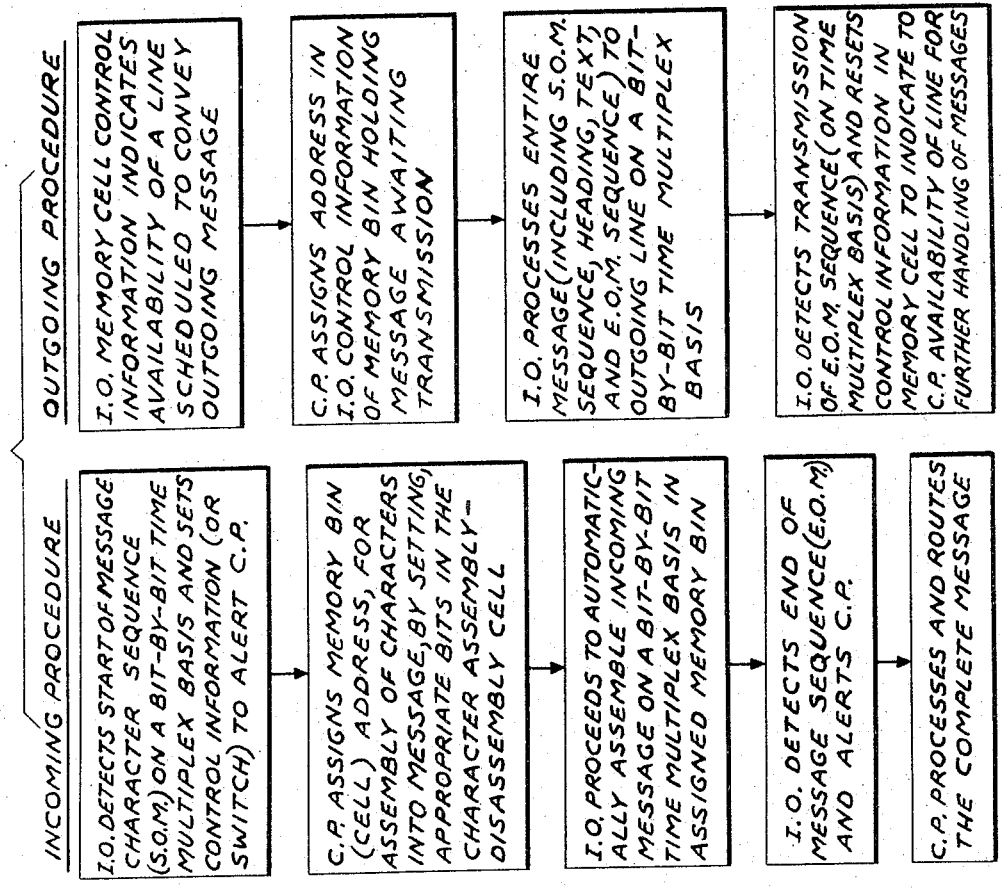
FIGURE 13 is a flow chart indicating the sequence of operations executed by the input-output and central processing systems of FIGURE 1 during reception and retransmission of a message.

FIGURE 18 is a chart useful in explaining the relationship between the states of certain control bits in the assembly-disassembly storage cell corresponding to a line handling start-stop teletype signals and the status of message reception on that line, with reference to the arrangement shown in FIGURE 14; and FIGURE 19 is a graphic illustration of the interleaving in time of the operations of the input-output and central processor systems shown in FIGURE 14.

*General description*

The general organization of a system arranged in accordance with the basic principles of the present invention is shown in FIGURE 1. Referring to this figure, there is shown therein a plurality of signal lines 1, 2 adapted to carry pulse message or data signals between the central switching facility embodying the basic principles of invention herein and a plurality of remote subscribers' stations and/or other central switching facilities. The lines 1 are referred to as input lines and the lines 2 are designated output lines. While the lines 1 and 2 are shown in distinct groups, it should be understood that individual pairs of the lines 1 and 2 may be intermingled in duplex signaling arrangements. Each line is provided with an individual buffer flip-flop device 3, 4, for storing a single element or bit of an incoming or outgoing message signal train. These bit buffers serve only to isolate the lines 1, 2 from the circuits shown connected thereto in FIGURE 1, and are not concerned with the timing of groups of signal elements transferring to or from the lines in the manner of prior line buffer arrangements. Thus, an incoming signal bit element on one of the lines 1 need only be sampled momentarily during a fraction of a bit interval, after which the signal is held in the associated buffer 3 until the next bit element is sampled, and conversely an outgoing pulse signal element is held in an associated buffer flip-flop 4—from which it is directly transferred to the corresponding output line 2—until a succeeding short duration pulse signal element is transferred to the same buffer. Between the buffers 3, 4 and the common input-output device 5, which embodies the basic principles of this invention, there are arranged selector switches 6, 7. The selector switch 6 serves to couple an individual one of the outputs of the input line buffers 3 to a common incoming line 8. Conversely, the selector switch 7 serves to selectively couple a common outgoing line 9 to an input of one of the output line buffers 4.

Within the input-output device 5 there is provided a rapid access memory unit 10 which may, for example, be a magnetic core storage array. This array includes an assembly-disassembly storage section or cell and a word storage cell reserved for each of the lines 1, 2, serviced by the device 5. Also included within the device 5 is a scanning control unit 11 which is adapted to provide scanning impulses on its output lines 12 and 13. These impulses serve to connect the common lines 8, 9 to the individual line buffers 3, 4, via switches 6, 7, in a predetermined sequence, while at the same time addressing corresponding assembly-disassembly storage cells in the unit 10, in the same sequence.

Within the device 5 the common lines 8, 9 couple to common character assembly-disassembly circuits 14 which function, via lines 15, to examine certain control and timing intelligence stored in the assembly-disassembly cell of memory unit 10 corresponding to each scanned signal line, during examination of the line by the scanning control unit 11. This control and timing intelligence includes the information required to determine when and how to transfer a bit of pulse signal intelligence between an addressed signal line and a predetermined bit storage position in the associated assembly-disassembly memory cell. Depending upon the particular type of pulse message signal being handled, the necessary control information may involve such diverse considerations as the time at which the signal on an addressed input line is to be sampled, with reference to a common clock circuit shared by all of the lines, the time at which a new signal bit is to be transferred to an addressed output line, the relative location or rank, within a character group, of a bit signal being transferred, the respective status of assembly or disassembly of an incoming or outgoing character, and the signaling condition (e.g. busy or idle) of an addressed line.

The equipment 5 further includes circuits 16, which are coupled via the lines 17 and 18 to the circuits 14 and the memory unit 10, respectively. The circuits 16 serve to automatically control the further collection or dispersion of individual characters respectively into or out of larger groups of stored characters, which are held in corresponding additional cells in memory unit 10, and which are hereafter referred to as message words or blocks depending upon the length thereof. Thus, for example, incoming signal elements are first assembled in storage into individual characters by means of the equipment 14, this taking place over a number of scanning cycles of the unit 11, and each assembled incoming character is thereafter automatically assimilated into a separately stored larger grouping of characters by the equipment 16.

It is deemed preferable to exert supervisory control over the functioning of the device 5 via a central processor unit, indicated at 19, acting through signal flow lines 20 shown connected to the dotted outline of the device 5. The processor 19 comprises a program controlled system similar to those provided in more conventional switching exchanges for controlling the flow of messages between the input and output lines, except that the program need not participate in the assembly or disassembly of message blocks, as the latter function is carried out automatically by the equipment 5. It will be shown below that this is quite efficient and economical from a system standpoint.

Processor 19 therefore asumes control of such diverse functions as assignment of message storage bins in the memory unit 10 for accumulation of messages, message routing (i.e. transposition of messages between incoming and outgoing cells of the memory unit 10 via the assigned bins), message booking, message journaling, subscriber billing, and general supervisory control over the operation of the device 5 whereby the foregoing functions can be accomplished without disruption of the line scanning process.

Reviewing the operation of the system of FIGURE 1, this system functions generally as follows. The device 5 cyclically scans all of the lines 1, 2, and the associated assembly-disassembly storage cells in the memory unit 10, by means of scan address selection impulses on the respective lines 12 and 13, the overall scanning period being of sufficiently brief duration to reliably ensure examination of the line carrying the shortest duration signal bits at least once during each bit interval. In each step of a line scanning cycle, the circuits 14 examine the information stored in the corresponding assembly-disassembly memory cell, together with certain common time reference signals discussed hereinafter. Based on this examination the circuits 14 determine whether a signal element or bit is to be transferred between the addressed line and a character bit storage position in the corresponding assembly-disassembly cell. Whenever a transfer is scheduled to take place the circuits 14 control the transfer and additionally alter the control information stored in the assembly-disassembly cell to prepare for the next bit transfer. When a complete character has been thus transferred, the circuits 14 energize the circuits 16 which then control the further transfer of the complete character into a corresponding word storage cell of the unit 10, if the message is an incoming one, or the further transfer of the next successive character out of the corresponding word storage cell, if the message is outgoing.

All of the foregoing may take place over a large number of scanning cycles, and during assembly of an incoming message in this manner, it may be desirable to examine the message for routing and other handling instructions, via an appropriately programmed operation of the central processor 19, or, if time permits, it may be desirable to program the processor 19 to examine the incoming message for routing and special handling instructions only after an entire message or message heading has been assembled in storage. The choice will, of course, depend upon the number of lines being serviced, and the particular system organization by means of which the operations of the device 5, and the more general operations of the central processor 19, are regulated or interleaved in time, as will be clear from the detailed description of an exemplary system to be given below.

Those skilled in the art will appreciate that the circuits 3, 4, 6, and 7, are of "state-of-the-art" construction, and therefore do not require further description except insofar as the number of such circuits must be taken into account in the specification of the speed of operation of the scanning control unit 11. The unit 11 preferably includes a counting circuit which is operated in response to clock or reference timing signals, and it should be understood that the respective forms of the access control signals provided on lines 12 and 13 will depend upon the respective organizations of the line selector switches and the memory unit. In any event the determination and implementation of any desired form of access control is considered to be a routine task for one skilled in the data switching arts.

*General description of assembly-disassembly circuits*

The general organization of the circuits represented by the blocks 14 and 16 in FIGURE 1 is presented in somewhat greater detail in FIGURE 2. The circuits 14 characteristically include an assembly-disassembly register 30 for assembling and disassembling pulse message characters on a bit-by-bit time division multiplex basis. For convenient reference, the register 30 is subdivided into three main sectors—a sector 31 in which the bits of a character being assembled or disassembled are held, a sector 32 in which information relating to the scheduled timing or sampling of an incoming or outgoing signal bit is held, and a sector 33 which holds other information required for the control of the assembly or disassembly of the bits of a character relative to sector 31. The register 30 communicates via the lines 15 with the memory unit 10 of FIGURE 1, and functions, in association with addressing signals provided by the scanning control unit 11 of FIGURE 1, to receive intelligence from the assembly-disassembly memory cell corresponding to each addressed signal line, and to subsequently return this intelligence, either altered or unaltered, depending on circumstances to be described hereinafter, to the memory cell from which it was taken. The brackets 34 are intended to indicate that the intelligence conveyed via the line 15 generally fills the entire register 30. The brackets 35, on the other hand, are intended to indicate that the exchange of complete characters via the word assembly-disassembly circuits 16, may be carried out solely with respect to the character storage sector 31 of register 30.

As denoted by the brackets 36 and line 37, sector 32 of register 30 cooperates with common timing control circuits 38 which, in turn, cooperate with common assembly-disassembly control circuits 39, via lines schematically indicated at 40, to produce control signals on line 41. These signals on line 41 act through a circuit block 42, designated common bit transfer logic, to transfer an incoming bit of a pulse message from the common signal line 8 to register sector 31, or, respectively, to transfer an outgoing bit from the sector 31 to the common signal line 9.

The circuit of FIGURE 2 operates in the following manner. Considering first the multiplexed transfer of the bits of a character from a particular input line to the common input line 8 and thence to the corresponding assembly-disassembly cell in the memory unit 10 of FIGURE 1. As the lines 1 in FIGURE 1 are periodically addressed by the scanning control unit 11 of FIGURE 1, the contents of the corresponding assembly-disassembly cells are passed back and forth between the memory unit 10 and the assembly-disassembly register 30 via the line 15 shown in FIGURE 2. The control information 33 in the register 30 is examined to determine whether the corresponding line is carrying a signal in start-stop telegraph code form, or a signal in a synchronous format in which individual bit synchronizing pulses accompany the intelligence signal bits.

Assuming first that the line under consideration is one on which there is a signal in start-stop telegraph code format, a bit of the control information 33 is examined by the circuits 39 to determine whether a character signal is arriving on the line; in other words, to determine if the line is or is not in the stop or rest signal condition. If the examined control bit indicates that the line signal is in the stop signal condition, the line is examined via line 41 and circuit block 42, and if no stop to start signal transition has occurred the intelligence in the register 30 is returned to the memory unit 10 unaltered. On the other hand, if a stop to start transition has occurred, indicating the start of an incoming character, the bit of control information which indicates the line status is reversed, via the circuits 39, and the circuits 38 are actuated to store certain time scheduling information in register sector 32, as described more particularly below, which is to be used in a later cycle of examination of the particular line under discussion to control the transfer of the first bit of intelligence in the incoming character into the register sector 31. The information in register 30 is then returned to its assigned storage cell in memory unit 10.

At the scheduled sampling time determined by the information in register sector 32, after a predetermined integral number of line scanning cycles have elapsed, the circuits 38 are actuated to produce a signal on a line 43 which controls the sampling and transfer of an incoming signal bit. The transferred bit is stored in a predetermined bit position in the register sector 31, after which the control information in sector 33 is modified, if necessary, and all of the information in register 30 is returned to the corresponding memory cell. In subsequent scanning cycles the foregoing process is repeated until a full character is stored in the register sector 31, the information in register 30 being cyclically shunted back and forth between the corresponding assembly-dissambly cell in the unit 10 and the register 30. After a full character, including the stop element, has been thus assembled, the circuits 39 are actuated to reset the line status control signal bit to indicate an idle or stop line signal condition, and the circuits 16 are actuated to transfer the assembled character from register sector 31 to a message storage bin within the memory unit 10 reserved for storage of groups of incoming characters taken from the particular line under consideration. This process continues until a complete message is passed into the message storage bin.

Considering on the other hand, an incoming signal of the synchronous type, in which the individual intelligence bits are accompanied by individual synchronizing pulses, the equipment shown in FIGURE 2 functions in a somewhat different manner to assemble the incoming signal bits first into single character groups and then into larger message groups within a reserved bin in memory unit 10. For such synchronous signals, the control information stored in the corresponding assembly-disassembly memory cell is arranged to indicate the type of signal carried on the line, by means of one of the signal bits appearing in the register sector 33, and to control the sampling of the signal on the line, when the binary level of the associated synchronizing signal and the binary level of a synch bit stored in register sector 32 are in predetermined relationship to one another. When the latter relationship occurs the line signal is sampled and the line intelligence signal level is transferred into register sector 31 while the synch bit in register sector 32 is reversed.

The transmission or disassembly process, by means of which character signal groups stored in a reserved message storage bin, are disassembled, first into characters stored in a corresponding output line assembly-disassembly cell, and then into separate bits or elements which are individually passed to a corresponding outgoing line, is basically the reverse of the procedure described above for the handling of incoming signals. Upon examination of an output, or outgoing, line by the scanning unit 11 of FIGURE 1, the corresponding assembly-disassembly cell intelligence is stored in the register 30 and the control information thereof in sector 33 is examined to determine the status of the line, while the information in sector 31 is examined to determine whether the line is ready to begin transmission of a new character. When required, a new character taken from a memory bin assigned to store a message signal train to be sent to the particular output line under consideration is transferred via circuits 16 to the register sector 31. During subsequent scanning cycles the control information and the sampling time scheduling information in the register sector 32 are repeatedly examined to determine the instants at which the signal on the line is to be varied in accordance with the intelligence signal elements stored in the sector 31, and after a complete character group of elements has been thus transmitted on the line a new character is taken out of storage and the cycle is repeated until an entire message has been transmitted.

*General description of assembly-disassembly circuits for start-stop telegraph code signals*

Referring to FIGURES 3 and 4 a better understanding may be had of the means by which multiplexed bits of signals in start-stop telegraph code form are transferred between the common assembly-disassembly circuits 14 and the input or output lines, 1 or 2, respectively, of FIGURE 1. FIGURE 4 illustrates the timing of a telegraph code character in start-stop format. The character typically begins with a predetermined start pulse signal element which is the binary inverse of the stop element. In a typical system, the start and intelligence pulse elements are of equal duration T while the stop pulse duration is at least 1.43T. Values for T and for 7.43T—the latter being the minimal duration of an entire character—corresponding to the most frequently used telegraph word transmission rates are indicated in tabular form in FIGURE 4. Thus, for example, a line signal having a basic element duration of 13.5 milliseconds would also have a character duration of at least 100 milliseconds and an associated word transmission rate of 100 words per minute.

Recalling that in FIGURE 1 each line carrying an outgoing start-stop telegraph signal of the type shown in FIGURE 4 is coupled respectively to the common incoming line 8 or outgoing line 9 during a predetermined step of each complete cycle of the equipment 11 of FIGURE 1, and that during the same scanning step the contents of the corresponding assembly-disassembly cell in the memory unit 10 of FIGURE 1 are reciprocally transferred between the associated memory cell and the register 30, the circuit of FIGURE 3 may be appreciated as follows. The equipment 39 is coupled via leads 50 and 51 and circuits 42, to the common incoming line 8, so that if an incoming teletype signal on an examined input line has just experienced a reversal from the stop to the start pulse condition, signifying the beginning of a character, a signal conveyed via the line 53 acts to alter the control information stored in sector 33 of the register 30 to indicate thereby that the incoming line under examination is in the process of receiving a character signal. During the same scanning cycle step, a signal conveyed via line 54 to a time increment adder circuit 55 actuates the latter to add a quantity corresponding to 1.5T to the output $t$ of a real time counter 56 which counts clock pulses appearing at terminal 57 thereof. The resultant sum quantity, $t+1.5T$ representing the anticipated time at which the first incoming intelligence bit element on the same incoming line is to be sampled—i.e. the anticipated midpoint in time of that bit—is transferred via the line 58 into register section 32. Upon each subsequent cycle of examination of the signal on the same line the information shuttled between the assembly-disassembly storage cell and register sector 32 is applied via the line 59 to a common time comparator circuit 60 which is also coupled to the counter 56, and when, finally, after a predetermined number of scanning cycle periods corresponding to the time 1.5T have elapsed, the compared time quantities are found to be in a state of agreement, an output is produced on lines 61 and 62 which controls the transfer of a signal corresponding to the first intelligence bit element into a predetermined bit position of register sector 31. The output on line 61 also acts, via an extension 63 of line 62 and circuits 39, to alter the line status control information in sector 33, and to actuate the adder 55, via the line 64, to add a time increment corresponding to 1.0T to the current output $t$ of counter 56, the sum quantity being thereupon entered in register sector 32 replacing the previous quantity stored therein.

Thus, while the assembly-disassembly information relating to a line being examined is cyclically shuttled between its permanent cell location in the memory unit 10 of FIGURE 1 and the register 30, the five incoming information pulse elements which constitute a character signal on the line are sampled near the midpoints in time thereof by the apparatus 38 to 42 common to all lines and corresponding bits are transferred into register sector 31.

Those skilled in the art will appreciate that there are many known procedures and circuits for distributing signals from a line to a register. I prefer, for example, to arrange register sector 31 in the form of a six stage shift register as shown in FIGURE 7, which is initially in a predetermined reset condition, and to shift the signal element sampled by the time comparator output through an input gate such as 70 successively into the register 31 proceeding from the first or lowest order bit position 71 therein towards the sixth or highest order bit position 72. This continues until a "1" condition initially stored in stage 71 arrives, after five shifts, at stage 72 causing a reversal of state thereat which indicates that a complete character is stored in the first five stages of register 31. It is then required to provide an indication via a gate such as 73, to control the transfer of the complete character thus assembled to the appropriate word storage bin memory unit 10 reserved for accumulation of groups of characters taken from the particular line under discussion. Following such transfer, of course, the register sector 31 should be reset to the initial state, and this should be followed by the usual retransfer of the entire output of register 30 to the associated assembly-disassembly cell in memory unit 10, after which a new cycle of character reception for the particular line under discussion may be initiated. It should, of course, be clear to those skilled in the art that the control information in register sector 33 must first be modified to indicate the return of the particular line under discussion to the stop pulse condition, so that the next stop to start transition may be anticipated by the equipment.

The converse operation, that required to transmit start-stop telegraph impulses having the form shown in FIGURE 4, to the line 9 in FIGURE 3, occurs as follows. During each cycle of examination of a particular output line conveying a start-stop telegraph code signal the control information in register sector 33 is examined to determine whether a full character is present in sector 34 awaiting transmission to the line. When a full character is first found to be present in sector 31 the line condition is altered, via lines 50 and 51 and circuits 42, to the start pulse condition, and the adder circuit 55 is actuated to add 1.0T to the state $t$ of the counter 56, and to transfer the sum $t+1.0T$ to register sector 32. Thereafter the information in register 30 is returned to the memory unit 10, in the usual manner. In subsequent cycles of examination of the same line, the information in sector 32 is compared to the state of the counter 56 by comparator 60, and when an agreement is detected a signal is produced on line 61 which controls the transfer of the first intelligence bit of a character stored in sector 31 to the common outgoing line 9. This process is repeated for all five intelligence bits during subsequent scanning cycles, and upon transmission of the fifth bit, an increment corresponding to 1.5T is added to the output $t$ of the counter 56, and the result $t+1.5T$ is placed in register sector 32. This last increment represents the anticipated duration of the stop element. Hence, in a predetermined later cycle of examination of the line under consideration, when the comparator output signifies the end of the 1.5T stop interval, a control signal is produced to control the acquisition and storage of a new character. For this sequence of operations the shift register shown in FIGURE 7 may again be employed. This arrangement is shown in FIGURE 8 wherein the highest order register stage 72 is coupled via a gate 74 to the common output line 9, and pulses which are derived from the output of time comparator 60 (FIGURE 3) are applied to the shift input of the register and, via a gate 75, to the "1" input of the first state 71 of the shift register. Thus, if the stage 71 is initially set to "0," after six shifts have occurred all stages of the register will coincidentally be placed in the "1" stage, whereby the register outputs indicated at 76, act coincidentally to excite an AND-circuit 77. The resultant AND-circuit output on line 78 is employed to reset the shift register circuit conditions so that stage 71 is in the "0" state and so that a start pulse condition is transferred to line 9. The same output on line 78 is also used to control the acquisition of the next 5-bit character from the memory word cell (storage bin) reserved for the line in question, and to control the transfer of that character to the assembly-disassembly storage cell allocated to the same line.

It should therefore be understood that after insertion of an outgoing start-stop telegraph code character into an assembly-disassembly storage cell of the memory unit 10, during subsequent cycles of interrogation of the cell, for each elapse of a time interval corresponding to 1.0T the information in shift register 31 is shifted one position to the right in FIGURE 8 until 5 shifts have occurred, moving the "0" initially set in stage 71 into stage 72. Thereafter, following the elapse of a time interval corresponding to 1.5T the "0" (stop element) is shifted out of stage 72, and the register outputs are then all in the "1" state. As a result, a control signal appears on line 78 to instigate a new cycle of acquisition and disassembly of a new character.

*General description of assembly-disassembly circuit for synchronous pulse signals*

Referring to FIGURES 5 and 6, synchronous data signals—i.e. data signal trains in which the individual bits are accompanied by individual synchronizing (abbreviated synch) pulses as shown in FIGURE 6—are treated in the following manner. Each synchronous data line is regularly scanned by the scanning apparatus 11 of FIGURE 1 and the contents of the associated assembly-disassembly storage cell in memory unit 10 are shuttled between that cell and the assembly-disassembly register 30, as described above for start-stop telegraph pulse signals. For each data line there is provided a separate synch pulse line (not shown) for conveying synch pulses corresponding to the data pulse elements. When the data line is coupled to line 8 or 9 in FIGURE 5 the corresponding synch pulse line is coupled to terminal 80 in FIGURE 5. Terminal 80 couples to a synch signal comparator circuit 81 and a common control circuit 82 the functions of which will become clear from the ensuing discussion.

Noting that the synch pulses shown in FIGURE 6 undergo a reversal in state in each bit interval, circuit 82 may be understood to function as follows. Assuming first that the transmission or reception of a synchronous data signal bit on a particular line has just commenced, the state of a corresponding synch bit stored in register sector 32a is reversed via a signal on a line shown schematically at 83 so that in each subsequent cycle of examination of the particular line the signals on lines 80 and 84 will fail to agree until the synch pulse on line 80 reverses its state. Thus, the comparator will not produce an output until after a synch pulse reversal has occurred, such reversal respectively denoting the time for sampling or transmission of an incoming or outgoing data bit.

For the particular line considered above, after the synch signal condition on line 80 has reversed signifying the beginning of a new bit interval, when the associated assembly-disassembly cell information is thereafter transferred into register 30 and the synch line associated with the said particular line is coupled to terminal 80, the comparator 81 will produce an output on line 85 which causes the circuits 42 to transfer the next data signal bit between the appropriate one of the common lines, 8 or 9, and the register sector 31. The comparator output signal also acts via lines 85 and 86 and control circuits 39 to excite an input 87 of the common circuit 82, whereby the synch bit stored in register sector 32a is inverted. The foregoing process is cyclically repeated, for the particular line in question, until an entire message has been thus assembled or disassembled.

It will, of course, be understood that the register sector 32a reserved for timing information need only have a capacity of a single bit and therefore the sectors 31a and 33a reserved respectively for storage of data signal bits and control information may be commensurably expanded if need be. It should further be appreciated that a synchronous data pulse signal train is an uninterrupted stream of bits which may be handled in arbitrary groups, providing that where intelligence is to be extracted from the train the signals therein must be examined in predetermined character groups. Thus, for example, synchronous data pulse trains may be handled between the memory and the assembly-disassembly register in bit character groups, in a manner somewhat similar to the handling of start-stop pulse signal trains, and, assuming that the synchronous intelligence actually consists of 9-bit characters, it would be necessary for the apparatus which extracts control or routing information from the train, as will be further discussed below, to view synchronous data signals in 9-bit groups. Thus, an incoming synchronous intelligence pulse train may be handled by the shift register arrangement shown in FIGURE 9, the shift pulses being derived from the comparator output 85 of FIGURE 5. Pulses corresponding to the shift pulses are applied to a gate 90 which transfers the incoming synchronous data pulse signals from the common line 8 to the register sector 31. For each synchronous data pulse line stage 71 of register 31 is preset, prior to reception of any 5-bit group of incoming signals, to the "1" state, and the other register stages are preset to the "0" state so that after 5 consecutive bits have been taken from line 8, the "1" bit preset in register stage 71 will have advanced to stage 72 and gate 92 will be excited to produce a group transfer and reset operation whereby the 5 bits of intelligence stored in the 5 stages preceding stage 72 are transferred as a group into a memory bin assigned to the particular line in question after which the register sector 31 is preset as described above prior to the return of the contents of register 30 to the corresponding assembly-disassembly storage cell in the memory unit 10. It will, of course, be appreciated that the number of elements in a group received in the foregoing manner may easily be increased by utilizing some of the stages of register 30 which are used in telegraph pulse reception to store time scheduling information and to couple gate 92 to the last of these stages.

With reference to FIGURE 5 the group transfer and reset operation of the output of gate 92 is controlled by the common control circuits 39 via signals carried on lines schematically indicated at 95 and 96.

For transmitting a synchronous data pulse train to an outgoing line 9, equipment similar to that shown in FIGURE 8 is employed. Specifically, referring to FIGURE 10, the shift register sector 31 is arranged to transmit synchronous data pulses to the line 9, in, for example, 5 bit groups, via a gate 100. The gate 100 is coupled to stage 72 of register 31. Stage 72 initially contains the first bit to be transmitted, and upon each transmittal of a bit the information in register 31 is shifted one bit position to the right and a "1" is entered into stage 71 via gate 101. Stage 71 is initially preset to the zero state so that the outputs 102 of the first 5 stages of register 31 will not coincidentally be in the "1" state until 5 shifts have been completed, and only then will the AND-circuit 103 produce an output at 104 to control the transfer from memory and disassembly of the next group of 5 bits.

*Cooperation of input-output device and central processor*

Figure 11:
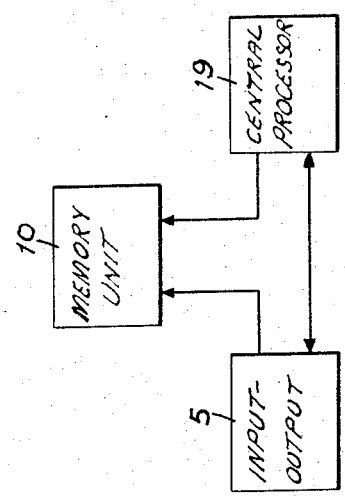
FIGURE 11 is a block diagram illustrating the time sharing of a common memory unit between the input-output and central processor systems of FIGURE 1.
Figure 12:
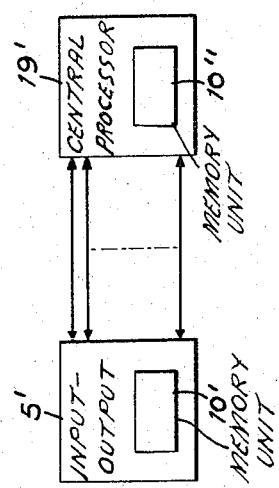
FIGURE 12 is an alternative arrangement to that shown in FIGURE 11 in which separate memories are deployed within the input-output and central processor systems.

Considering now the relationship between the input-output device 5 and the central processor 19 of FIGURE 1, reference will be had to FIGURES 11 to 13. In the preferred organization shown in FIGURE 11 the input-output device 5 and central processor 19 are arranged to time share a single memory unit 10 in a manner which will be further elaborated upon below in the discussion of FIGURE 14. In this type of system organization the device 5 assembles or disassembles message signals in a bit multiplex routine as generally described above and examines the signals on each line in sequence for start of message (SOM) and end of message (EOM) character sequences. When an incoming SOM sequence is detected for any input line, the device 5 notifies the central processor and the latter selectively assigns a memory bin to the line in question for assembly of the incoming message. This is accomplished via appropriate handling of the control signal bits stored in the assembly-disassembly storage word associated with the line in question. The device 5 thereafter proceeds to transfer each fully assembled incoming character to the assigned memory bin while examining the message for an EOM character sequence. Upon detection of the EOM sequence the stored assembly-disassembly information is modified to notify the central processor of such detection, and the latter thereafter proceeds to process the message in its entirety, in the manner of conventional exchange facilities. That is, the central processor thereafter proceeds to examine the message for routing instructions, to journal the message on a separate storage tape if desired, to determine the billing information for charging the appropriate customer, and so forth. It should particularly be noted that by having the central processor assign the memory block or cell in which the message is to be assembled, it is not necessary to provide an individual cell for each line scanned by the apparatus 5. This is permissible because, in general, a very small percentage of the lines will be simultaneously carrying messages. The foregoing sequence of events is illustrated in chart form in FIGURE 13.

In the same chart the converse sequence associated with the disassembly and transmission of a stored message is also characterized. Thus, in the outgoing procedure, it is indicated that when a line is available to carry a message destined for routing thereto, the central processor assigns a memory bin address in the assembly-disassembly cell signifying the location of the message. The input-output device then proceeds to automatically disassemble the message to the outgoing line, the message having been previously edited by the central processor to include a preceding SOM character sequence and a succeeding EOM sequence. Upon transmission of the last character in the EOM sequence, the device 5 automatically resets the assembly-disassembly control information to the initial state signifying an idle line, thereby notifying the central processor that the line is available for further handling of messages.

Throughout all of the foregoing, the device 5 and the central processor are alternately coupled to the memory unit 10 in a regular scanning time allotment pattern. Alternatively, the system can be arranged as shown in FIGURE '12 with a separate memory unit 10' in the device 5' and a separate memory unit 10" in the apparatus 19'. This permits the actual communication time between the central processor and the device 5 to be minimized because the examination of routing instructions and the assignment of storage cells can take place within the central processor independently of the functions carried on within the apparatus 5. The ensuing description, however, should be read with reference to the organization shown in FIGURE 11.

Details of system organization of particular embodiment

Referring to FIGURES 14 to 19, details are shown of a particular arrangement of apparatus in accordance with the present invention which can accommodate up to 96 duplexed start-stop telegraph lines or 128 duplexed synchronous data lines, or combinations of lesser numbers of such lines. As indicated in the table of FIGURE 15 the system shown in FIGURE 14 can accommodate, for example 96 teletype lines any or all of which carry signals at the rate of 60, 75, or 100 words per minute. Alternatively the system can handle up to 32 duplexed lines of synchronous signal traffic at the rate of 2400 bits per second, or 64 duplexed synchronous data lines at 1200 bits per second or 128 duplexed synchronous data lines at 600 bits per second. Where both start-stop telegraph and synchronous data lines are handled the number of lines which can be accommodated will depend upon the transmission rates of the synchronous data signals. Referring to the table in FIGURE 4, it may be seen that if the basic cycle of the scanning apparatus 11 of FIGURE 1 is chosen to be 1.125 milliseconds, then any or all of the 3 standard telegraph word transmission rates can be easily handled by common timing apparatus because 1.125 is a common divisor of all 3 periods T listed in the table of FIGURE 4 as follows:

$$1.125 \times 12 = 13.5$$
$$1.125 \times 16 = 18.0$$
$$1.125 \times 20 = 22.5$$

Thus, for signals having respective intelligence bit durations of 13.5, 18.0, or 22.5 milliseconds time increment corresponding respectively to 12, 16 or 20 cycles of scanning of the line in question would have to be added to the contents $t$ of real time counter 56 in FIGURE 3.

Referring to FIGURE 14, an exemplary arrangement of apparatus designed to accommodate any of the traffic arrangements specified in the chart of FIGURE 15, comprises a line counter 110 which cooperates with gates 111 to provide regular cycles of predetermined sequences of output states corresponding to a desired pattern of scanning of the traffic carrying lines and associated assembly-disassembly memory cells. To simplify the drawing the line selector switches and traffic carrying lines have been omitted with the understanding that the branch output line 112 emanating from the counter 110 couples to the line selector switches by means of which the various incoming and outgoing lines are respectively coupled to the common multiplexed traffic carrying lines 8 and 9. To further simplify the drawing, multiple line connections between the various blocks in the figure are indicated by single lines and numerical notations in parentheses next to such single lines indicating the actual number of lines intended to be shown. Thus, the output of the particular counter 110 comprises a 7-bit collection of parallel signals indicating that the counter 110 is capable of assuming a maximum of $2^7$ or 128 different states.

The output of the counter includes a 7 line branch 113 which couples to the access controls 114 of a memory system indicated generally by an arrow at 10. The memory system 10 in the particular example under consideration includes a 16,000 word magnetic core storage array 115; a word being composed of 20 cores. As may be understood from the previous general explanation above the array 115 includes an assembly-disassembly storage cell for each line scanned by the counter 110. Each such cell comprises at least two 20-bit words. Whenever a word group of 20 cores is appropriately addressed via the access controls 114, a word of information is transferred between that group of cores and a 20-bit memory buffer 116. The memory buffer 116 is coupled via lines 117 to the assembly-disassembly register 30, via lines 118 to a series of gates 119, via lines 120 to a bin address buffer 121, and via lines 122 to the central processor 19. Signals are passed between sector 31 of register 30 and the gates 119 via an intermediate character buffer 123 and the lines 124 and 125 extending between the register 30 and the buffer 123, and between the buffer 123 and the gates 119, respectively. An address increment adder 126 is coupled via lines 127 to the bin address buffer 121.

The assembly-disassembly register 30 is coupled via lines 128 to the main controls 129 of the input-output system. In the particular illustration of FIGURE 14 there is shown the format of a word of intelligence required for assembly-disassembly of a start-stop telegraph pulse signal and the associated circuits required for processing the intelligence stored in the register 30. It is noted that the same arrangement can be used to handle synchronous pulse data signals only if the synchronous information characters are each 5 bits in length. For larger character lengths, a different circuit arrangement would be required as will be clear from the following discussion.

Thus, for assembly-disassembly of start-stop pulse information, the register sector 31 is coupled via lines 130 to a special character detector 131 which is also coupled to the register sector 33 via lines 132. There is also provided a real time counter 133 having a 7-bit output $t$ coupled to a time increment adder 134, the output of which, representing the quantity $t+KT$ couples to the register sector 32. A comparator 135 is coupled via lines indicated at 136 and 137 respectively to the counter 133 and register sector 32 respectively.

The apparatus thus far described functions in the following manner. The in-out controls provide recurrent timing pulses denoted A and B which have respective periods of 2.5 and 375 microseconds. The controls 129 also provide control signals denoted $x$, $y$, and $z$, each of which represents a plurality of control functions and a corresponding plurality of control lines. The line counter 110 in cooperation with the gates 111 and in response to the signals $x$, A and B cycles twice through a predetermined series of states in each 375 microsecond interval. After each such cycling a signal produced on line 138 switches a flip-flop 139, the outputs of which, designated V and V', are respectively coupled to the in-out controls 129 and the central processor 19. Thus, the central processor and the in-out controls 129 are alternately coupled to the memory system 10 during each 375 microsecond interval in the manner indicated graphically in the time chart of FIGURE 19.

Concentrating for the moment on the operation of the in-out circuits in FIGURE 14—i.e. the operation resulting when the output V of flip-flop 139 is marked—as the line counter 110 cycles through its predetermined sequence of states, the corresponding assembly-disassembly cells in the memory are addressed through the access controls 114 and the contents thereof are read via the buffer 116 into the assembly-disassembly register 30. The contents of register 30 are acted upon by the circuits 131, 133, 134 and 135, and if a complete character has not been assembled in or dispersed from the register sector 31, the contents of register 30 are returned via the buffer 116 to the memory 115, all of this taking place within 2.5 microseconds. On the other hand, if a complete character has been assembled in or dispersed from the register sector 31 as denoted by the marking of the signal output line 140 (note $W_{1-4}$ in FIGURES 7 to 10) of this sector, the resultant output signal on line 140 is coupled via line 141 to the in-out controls 129 which then act via the $x$, $y$, and $z$ outputs thereof to prevent stepping of the counter 110 for an additional 5 microseconds, while a number of additional operations are performed as follows. First, the memory access controls 114 are actuated by the signals $y$ to transfer a second 20-bit assembly-disassembly word of information from the storage cell associated with the line then being scanned to the bin address buffer 121 via memory buffer 116 and lines 120. Actually, only 16 of the 20 bits in this second word are transferred via the lines 120 because only 16 bits are required for a bin address. The bin address information has previously been placed in the cores of the second word by the central processor 19, in a manner to be described hereinafter.

If now register 30 has just assembled an incoming character, the assembled character will have been placed in character buffer 123 during the foregoing 16 bit bin address transfer. The buffer 121 transfers a bin address signal corresponding to 14 of the 16 bits taken from line 120 to lines 142 thereby addressing a predetermined one of the 16,000 words in memory 115 via the access controls 114. The remaining 2 bits stored in the address buffer 121 appear as signals on lines 143 and select thereby one of four groups of 5 output line paths, out of 20 possible paths represented by the 20 outputs of the gates 119, for transmission of the assembled character held in the buffer 123. This character thus passes via five of the 20 lines indicated at 118 and via memory buffer 116, into a 5-bit cell in a bin located at the address specified by the signals on lines 142. At this point the increment adder 126 is actuated to add a predetermined increment to the bin address stored in buffer 121 via the lines 127 so that the next 5-bit character assembled from the line under consideration will be placed in a consecutive 5-bit cell within the memory unit 115, and so forth until an entire message has been assembled in the bin originally assigned by the central processor. A memory bin consists of approximately 256 words, which is sufficient for storage of most messages. After incrementing of the bin address, the bin address is returned to the second word in memory from which it was taken, by appropriate excitation of certain of the output lines y of the controls 129, and by further appropriate excitation of others of the lines y, the contents of the assembly-disassembly register are returned to the first 20-bit word cell corresponding to the line then being scanned.

In the reverse situation wherein a character has been completely dispersed from register sector 31, a similar sequence of events in reverse takes place. Specifically, the bin address is placed in buffer 121 and acts through lines 142 and 143 to transfer a 5-bit character into buffer 123, after which the bin address quantity is incremented by adder 126 and restored to its previous second word position in the assembly-disassembly memory. Meanwhile the contents of character buffer 123 are transferred into register sector 30, and after restoration of the bin address information in register 121 to the appropriate second word position in the assembly-disassembly memory cell the contents of register 30 are returned to the corresponding first word position in the same memory cell.

After the return of the contents of register 32 to the memory 115, the x output of controls 129 is suitably actuated to permit the counter 110 to advance to the next line addressing position in its predetermined sequence. As mentioned above, the register 30 is shown with reference to the format therein of a start-stop telegraph assembly-disassembly word and the circuits shown coupled to register 30 are intended to act solely on start-stop telegraph signals. Thus 7-bit places are provided in sector 32 for storage of the anticipated real time quantity $t+KT$— where K is either 1.0 or 1.5 as previously explained— which is to be compared with the output of real time counter 133 by comparator 135. An additional 6 bits are reserved in register sector 31 for storage of a character undergoing assembly or disassembly, and 7-bit places are provided in sector 33 for storage of control information. The latter includes two bits for indicating the line transmission speed (60, 75, or 100 words per minute), three bits for indicating the status of message processing, as discussed further below, one bit for indicating the line signal status (i.e. stop or other), and one bit for indicating the type of signal (i.e. telegraph start-stop). For an input telegraph line, if the line signal status bit indicates that the line is in the stop condition, while the actual condition of the line, as sensed by the main controls 129 via the connection thereto to the common input line 8, is a start pulse condition, the output $t$ of counter 133, augmented by 1.5T, is entered in sector 32, as previously explained. Then the line signal status bit is inverted. The quantity 1.5T above is selected in accordance with the two speed control bits in sector 33. The word in assembly-disassembly register 30 is thus prepared to control the transfer of the first intelligence bit of a character being received on the line being scanned.

The foregoing discussion is based on the assumption that the transmission of a message is in progress on the line being scanned. Some or all of the foregoing actions, however, may not take place depending upon the state of progress of the message. Considering first an incoming start-stop message on an input telegraph line, and referring to FIGURE 18, before the message commences, the three message status bits in register 33 which are capable of representing in combination 8 distinct states, or message status conditions, are in a first octal digit stage, state "0," signifying the absence of a message on the associated line. Each message is preceded by a SOM character sequence consisting of the characters Z, C, Z, C. Thus, when the first SOM character Z is assembled in sector 31, the circuit 131 responds by setting the three message status bits to a second octal state, state "1." Then if the next SOM character C is assembled in sector 31, apparatus 131 sets the three message status control bits to a third state "2." This continues for the third and fourth characters, Z and C, respectively, in the SOM sequence, and the three control bits are progressively advanced to octal states "3" and "4." If at any stage of the SOM reception the next character in the above sequence should fail to appear, the apparatus 131 responds by resetting the three message status control bits to octal state "0." When the message status bits are in state "4," the central processor (CP) 19 during its cycle of access to the memory 115 examines these bits, and notes thereby that an SOM character sequence has been thus received on the particular line in question. Accordingly, the CP assigns a bin address for assembly of the incoming message by entering the required bin address information in the second word position in the assembly-disassembly cell associated with the line being scanned. Thereafter, each incoming fully assembled character is stored in the assigned memory bin, as described above. This continues until a full end of message sequence (EOM) is received and recognized by the special character detector 131 as follows.

Whenever the telegraph code character "N" is received during message transmission the message status bits are changed from octal state "4" to state "5" by the detector 131. If this is followed consecutively by the assembly of a second character N in register 30, the detector 131 sets the message status bits to the state "6," and otherwise resets the status bits to state "4." If three consecutive "N's" are assembled the status bits are set to state "7," and finally if four consecutive "N's" are fully assembled the detector 131 responds by setting the status bits to the initial state "0." Thus, when the central processor 19 during its cycle of access to the memory 115 detects a "0" message status for a line to which a message storage bin has already been assigned, a program is set in operation which ultimately results in the processing of the message to its intended outgoing line destinations.

The converse procedure, that required for transmission of a start-stop pulse message to an outgoing telegraph line takes place as follows. The central processor assigns a bin for disassembly of the message and stores the address thereof in the bin address word of the assembly-disassembly cell associated with the intended outgoing line destination. The central processor changes the message status bits to octal state "1" and the multiplexed in-out controls thereafter proceed to automatically transfer each consecutive character of the message, including the SOM and EOM sequences, out of the consecutive bin storage cell positions thereof and to disassemble the same via the assembly-disassembly cell of the intended output line. When the entire message has been sent out, the message storage bits are set to state "0" indicating to the central processor that the line is again idle.

It should be noted that the assembly-disassembly control bit indicating that the line signal is in a start-stop form, rather than in synchronous form, may not be needed if the lines are arranged in a predetermined sequence, such that all of the synchronous signal lines are in one particular group while all of the start-stop telegraph lines are in another distinctive group. In the latter instance it is possible to ascertain the type of signal traffic on the line by reference to the state of counter 110. Thus, the line status control bit could be used instead to supplement the octal message status bits; for example, to alert the central processor to an imminent start or end of message.

It should be noted that for a data signal in synchronous form the assembly-disassembly procedure is essentially that described above in connection with FIGURES 5, 9, and 10, except that the method of special character detection and the manner in which characters are transferred between the assigned memory bins and the register 30 will be different according to the number of bits consistuting a character. For 5-bit characters the circuits shown are adequate. For larger character lengths, however, it is deemed preferable to employ a larger assembly-disassembly sector 31 and larger character buffer and special character detector circuits, 123 and 131 respectively. Thus, for 6-bit synchronous characters, it is desirable to provide an extra bit place in assembly-disassembly sector 31, as well as circuitry designed to accommodate 6-bit character groups in both the buffer 123 and special character detector 131. As previously noted the extra bit required for the assembly-disassembly sector 31 is available because for synchronous data handling sector 32 need only accommodate a single timing bit.

To avoid overcomplication and prolixity in the disclosure, the details of the various blocks 19, 111, 114, 119, 121, 126, 129, 131, 134, and 135 have been omitted. These blocks all comprise switching circuits, the design principles of which are presently considered standard. For example, reference may be had to the text, "Logical Design of Digital Computers," authored by M. Phister, Jr., particularly pages 144 to 164 which concern the design of sequential switching circuits such as are required for the gates 111, the controls 129, and special character detector 131, and which concludes with a suggestion that the procedures therein specified are of such standard form that they lend themselves to automatization techniques whereby a computer program might be employed to convert a crude initial design effort into a refined finalized design.

Referring to FIGURE 15, it is seen that the system shown in FIGURE 14 can accommodate either 96 ($n_A$) teletype lines, or 32 ($n_B$) synchronous lines on which the transmission rate is 2400 bits per second, or larger numbers ($n_C$ or $n_D$) of synchronous lines operating at lower transmission rates, or combinations E of synchronous and teletype lines, limited by the inequality formula listed in row E of the second column of the table. Examples $E_1$ and $E_2$ are given illustrating two such combinations. Example $E_1$ indicates that 32 ($n_A$) teletype lines could be accommodated together with 16 ($n_B$) synchronous lines operating at transmission rates of 2400 bits per second and 16 ($n_D$) synchronous lines operating at transmission rates of 600 bits per second. when substituted in the above-mentioned inequality formula, this yields a sum of terms of approximately 30.7 which satisfies the formula.

In FIGURE 16 it is interesting to note that the smallest synchronous bit period has a duration equal to 1.11 basic scan cycles, where a basic scan cycle, as previously explained, has a duration of 375 microseconds (noting that each full line scan cycle comprises two sub-cycles, one of which is allocated to the functioning of the input-output apparatus in FIGURE 14 and the other of which is devoted to the central processor 19 in the same figure). It is also interesting to note that in FIGURE 16 each of the basic telegraph word transmission rates corresponds to an information element duration, in terms of 375 microsecond scan cycles, which is an even valued integral quantity; 36, 48 or 60. This permits a true match to be obtained between inputs to the comparator 135 in FIGURE 14 for all time increments KT and for all basic word transmission rates. Thus, it is noteworthy that the basic line scan period of 375 microseconds has been especially chosen to be a common divisor of the information element durations for all basic teletype word transmission rates, so as to assure proper functioning of the comparator 135 with reference to the stepping of the real time counter 133.

Referring to FIGURE 17 the scanning procedures for scanning two of the arrangements of lines indicated in FIGURE 15 are described. Thus, for arrangement D of FIGURE 15, in which 32 synchronous lines independently carry signals recurring at the rate of 2400 bits per second, 190 microseconds are allotted in each full scanning cycle for scanning the lines and for transferring an average of 3 incoming and 3 outgoing characters respectively to and from assigned message storage bins in the memory unit, and the remaining 185 microseconds of each cycle is then given over to the control of the central processor so that the latter can assign message storage bin addresses and process assembled messages. As previously noted, to accomplish such processing the central processor is required to regularly examine the line assembly-disassembly cells for control information indicating that an assignment of a message storage bin address is required, or that a message is awaiting processing. Those skilled in the art will of course appreciate that these two indications may be given independently of access to the memory 115 by providing a bank of flip-flops including a pair of flip-flops for each signaling line. Thus, one flip-flop of the pair could be selectively set to indicate that a bin address assignment is required for the associated line, while the other flip-flop of the pair could be set to indicate that an end of message train has been received and therefore that a message is stored in the assigned bin and is awaiting processing. By such means the central processor could be immediately notified of a need for action on its part, without scanning the memory, but of course the bank of flip-flops then imposes an increased burden in terms of system hardware.

It should be noted that the actual number of character transfers required during any particular scanning cycle will be a random function dependent upon the message traffic. The probability of very much more than 3 incoming and 3 outgoing character transfers being required in any one scanning cycle is very small, and the probability of having enough transfers to interfere with a full cycle of scan may be shown to be on the order of $4 \times 10^{-6}$ in any 24 hour day.

For the sake of completeness memory access lines 150 and control lines denoted by the symbols $x'$ and $y'$ are shown emerging from the central processor 19 in FIGURE 14. The lines 150 couple to the access controls 114 for the obvious purpose of gaining access to the memory during enablement of the central processor by the signal V'. The signals denoted $x'$ and $y'$ couple to the memory system 10 and to the line count gates 111, and provide thereby control over the functioning of the line counter and access to the memory whereby the central processor can examine and modify information stored in the memory for each of the lines accommodated by the input-output apparatus.

FIGURE 19 indicates in graphic form that the central processor (CP) and input-output circuits (IO) are rendered alternately effective during alternate sub-cycles of the scanning apparatus, the horizontal line segments indicating activity on the part of respective apparatus, and the small vertical strokes through the horizontal line segment indicating various sequential steps associated with the functioning of such apparatus. Thus, for example it is shown that in the first horizontal stroke representing operation of the CP, the CP may run through a program of operations in which an addition is followed by a multiplication which in turn is followed by a sensing of a particular message status octal digit group for a particular line. It should be noted in this respect that such sensing of status bits must occur frequently enough to assure that there is no backup of messages arriving or leaving on any line. There are many techniques which may be employed of course to assure such frequent sensing, but it is believed that a discussion of such methods would serve no useful purpose herein.

Referring again to FIGURE 17, and particularly to the procedure for scanning the combination of lines $E_1$ of FIGURE 15, it should be especially noted that each cycle of 375 microseconds is given over to the scanning of a different group of lines. In the first scan cycle all of the 16 duplexed synchronous lines operating at transmission rates of 2400 bits per second (type B) are sampled together with 16 of the teletype (type A) duplexed lines, an average of 3 incoming and 3 outgoing characters are transferred relative to memory and the central processor is effective for the remaining 185 microseconds. Then in the next scan cycle all 16 type B lines are again scanned, this time along with the remaining 16 duplexed type A lines, an average of 3 incoming and 3 outgoing characters are again transferred relative to the memory and the central processor again functions for an average of 185 micro-seconds. Finally, in the third scan cycle all 16 type B lines and all 16 type D duplexed synchronous lines (600 bits per second) are scanned, an average of 3 incoming and 3 outgoing characters are transferred relative to the memory and the central processor again functions for an average of 185 microseconds. The above scan cycles are then regularly repeated. Thus, each of the high speed synchronous lines receives service every 375 micro-seconds while each of the slower speed teletype and synchronous lines receives service every 1125 microseconds. Referring to the chart in FIGURE 16, it may be seen that this is quite adequate. On the type D lines each element has a duration of 4.45 scan cycles. Thus, each element will be examined at least once in 3 consecutive scanning cycles of the equipment 14.

The same scanning pattern arrangement $E_1$ described in FIGURE 17 is also adequate for the teletype (type A) signals because, referring to FIGURE 16, the numbers 36, 48, and 60, characterizing the teletype information element durations in scan cycles are integral multiples of three. Thus, it should be understood that although each teletype line is examined only once in three consecutive cycles, the element durations in terms of multiples of 3 consecutive scan periods would be 12, 16, or 20. It should also be understood that for arrangement $E_1$ above the time increments added into the register 32 in FIGURE 14 need not be changed, but that the operation of the counter 110 will be considerably different in view of the fact that in each 375 microsecond scanning interval the counter must cycle twice through a different sub-sequence of states comprising the states necessary to examine all of the type B lines, and different groups of the type A and type D lines.

It is noteworthy that with the arrangement shown in FIGURE 14, 96 teletype lines (see Example A, FIGURE 15) can share the same time increment adder 134, the same comparator 135, and the same real time counter 133, whereas in prior art systems a separate timing system must be assigned to each line. It is also significant that all teletype lines share the same buffer register 31, whereas prior art apparatus requires a separate 6-bit buffer register per line. The saving in hardware afforded by the present apparatus is therefore quite significant.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse data signal exchange comprising:
a plurality of lines;
a memory unit having a storage cell therein corresponding to each said line;
means for simultaneously scanning said lines and said corresponding memory storage cells in a predetermined multiplex scanning sequence; and
means coupled to said scanning means for transferring pulse information signal elements between said lines and said corresponding memory storage cells on an element-by-element multiplex basis.

2. A binary pulse data signal exchange comprising:
a plurality of lines;
a memory unit having a storage cell therein corresponding to each said line;
means for scanning said lines and said corresponding storage cells in a predetermined multiplex scanning sequence;
means common to all of said lines for timing the arrival and departure of binary signal bit elements propagating on said lines; and
means coupled to said scanning and said common timing means for transferring binary signal bit elements between said lines and said corresponding memory storage cells on a bit-by-bit multiplex basis under the control of said common timing means.

3. A binary pulse data signal exchange comprising:
a plurality of input and output lines;
a memory unit having a storage cell therein corresponding to each said line;
means for periodically scanning said lines and said corresponding storage cells in a predetermined scanning sequence;
means coupled to said scanning means for transferring pulse data signal bits on a bit-by-bit multiplex basis between said input lines and said corresponding memory storage cells and between said corresponding memory storage cells and said output lines; and
means coupled to said bit transferring means for transferring signal bits in plural bit groups between the memory storage cells corresponding to said input lines and memory storage cells corresponding to output lines selected in accordance with routing instructions contained within said transferred bit groups.

4. A binary pulse data signal exchange system comprising:
a plurality of input and output lines;
a memory unit having a storage cell therein corresponding to each said line;
means for periodically scanning said lines and said memory unit in a predetermined scanning sequence;
means common to all of said lines for timing the arrivals of incoming pulse data signal bits carried on said input lines and the departures of outgoing pulse data signal bits carried on said output lines;
means coupled to said common timing means for transferring signal bits between said input lines and the corresponding memory storage cells and between the memory storage cells and corresponding output lines; and
means coupled to said last-mentioned means for transferring signal bits in multiple bit groups between the storage cells corresponding to said input lines and the storage cells corresponding to selected output lines selected in accordance with information contained in said multiple bit groups.

5. A binary pulse data signal exchange system comprising:
a plurality of input lines and a plurality of output lines;
a rapid-access memory unit having a storage cell therein corresponding to each said line and having a plurality of auxiliary storage bins therein for storing messages destined to be transferred on a character-by-character basis between the storage cells corresponding to said input and output lines, each said storage cell having the capacity to store a plurality of signal bits;

means for periodically scanning said lines and said corresponding storage cells in a predetermined scanning sequence;
common character assembly-disassembly circuit means coupled to said memory unit and said scanning means for transferring signal bits on a bit-by-bit multiplex basis between said lines and the corresponding storage cells;
central processing means coupled to said scanning means and to said memory unit for selectively storing the address of an auxiliary storage bin in a storage cell corresponding to a line;
means coupled to said scanning means and said assembly-disassembly means for transferring signal bits between said lines and said corresponding cells on a bit-by-bit multiplex basis; and
means coupled to said central processing means and said memory unit for transferring signals in plural bit character groups between said corresponding storage cells and said assigned auxiliary storage bins specified by said stored address;
whereby entire messages are transferred from input lines to corresponding memory storage cells on a bit-by-bit basis, thence to selectively assigned auxiliary storage bins on a plural bit character-at-a-time basis, thence to storage cells corresponding to selected output lines on a character-at-a-time basis, and thence to said selected output lines on a bit-by-bit basis.

6. A binary pulse signal exchange comprising:
a plurality of input and output binary pulse signal transmission lines;
a random access memory unit having an assembly-disassembly storage cell therein allocated to each said line and further including therein a plurality of auxiliary storage bins the number of which is less than the number of said lines; and which can be allocated to said line storage cells on a selective basis;
means for periodically scanning said lines and said corresponding line storage cells in a predetermined scanning sequence;
an assembly-disassembly register;
means coupled to said register and operative during each sequential step of said scanning means to shuttle information signals between said line storage cells and said register, whereby the contents of each said line storage cell may be sequentially examined and returned to storage while the associated line is being scanned;
means coupled to said assembly-disassembly register during the storage therein of the contents of each line storage cell for selectively transferring an element of binary intelligence between the corresponding line and said register during a scanning cycle determined in accordance with certain timing and control information taken from the corresponding storage cell;
means for selectively varying said timing and control information following each said transfer of an intelligence element;
program controlled central processing means effective to periodically examine said control information stored in said line storage cell and to selectively assign and store in each said cell the address of an auxiliary message storage bin then available for storing a message to be transferred between said cell and the corresponding line via said assembly-disassembly register, said central processing means being also operative to recognize, via said control information, the completion of the transfer of a message relative to the said corresponding storage cell and thereupon to take action to process a message stored in said assigned auxiliary bin in its entirety, such processing including routing of a received message to one or more output line storage cells for transmission thereby to the intended recipients; and
means coupled to said assembly-disassembly register and said memory unit for conveying said selectively transferred elements of binary intelligence in predetermined character groups between said assembly-disassembly register and predetermined storage positions within said assigned memory storage bin.

7. An exchange system according to claim 6 wherein said means for varying said timing and control information includes a special character signal detector which is effective to examine binary intelligence signal elements transferred to said assembly-disassembly register in predetermined character groups and in response thereto to vary said control information through a predetermined sequence of digital states whereby said control information is capable of indicating to said central processing means the status of reception or transmission of a message being respectively received or transmitted on the corresponding line.

8. An exchange system according to claim 6 wherein a plurality of said input lines are adapted to carry binary signals in the form of a telegraph start-stop code while the remaining plurality of said input lines are adapted to carry signals in the form of an uninterrupted binary data signal stream having the individual bits therein identified by corresponding binary synchronizing pulses; and further wherein
the said output lines include a plurality of lines carrying signals in telegraph start-stop form and a remaining plurality of said lines carry signals in an uninterrupted binary stream format accompanied by individual bit synchronizing pulses.

9. A system according to claim 8 wherein said means for selectively transferring in accordance with said timing information includes:
means common to all of said telegraph start-stop signal carrying lines for producing a real time digital count indication;
common means coupled to said count indication producing means for adding a selectively predetermined increment of time representing a predetermined integral number of cycles of said scanning means to said count indication in accordance with said control information and for storing the result in said assembly-disassembly register during the occupancy thereof by the assembly-disassembly cell information corresponding to the line then being scanned by said scanning means; and
common means for comparing the anticipated time information stored in said assembly-disassembly register to the real time indication output of said time indication producing means.

10. A system according to claim 8 wherein said means responsive to said timing information includes:
means common to all of said line carrying streams of uninterrupted synchronous binary data for examining the synchronizing pulses accompanying the data bits on said lines in synchronism with the scanning of said lines by said scanning means;
means for comparing said examined synchronizing pulses to a bit of timing intelligence stored in said assembly-disassembly register during the scanning of each corresponding line, said comparing means being responsive to a predetermined state of agreement between the inputs thereto to provide a control signal which is effective to invert said bit of intelligence stored in said register and also to control the transfer of a bit of binary intelligence between said register and the line then being scanned.

11. A binary pulse data exchange comprising:
a plurality of lines adapted to carry telegraph start-stop code signals at different baud rates;
a memory unit having a storage cell therein allocated to each said line;

scanning means adapted to periodically scan said lines and said allocated memory cells in a predetermined sequence and over a predetermined scanning period which is a common divisor of the different element durations corresponding to the reciprocals of said different baud rates; and means operated in step with said scanning means for selectively transferring start-stop pulse signal elements between said lines and the cells allocated thereto on a bit-by-bit basis in accordance with certain control and timing information stored in said allocated cells.

12. A pulse data signal exchange comprising:

a plurality of input lines for conveying pulse data signals of various different kinds including:
- a first plurality of input lines for conveying pulse telegraph signals, arranged in a start-stop format, at a number of different intelligence element recurrence rates; and
- a second plurality of input lines for conveying binary pulse data signals arranged in the form of uninterrupted streams of signal bits in which the individual bits of each stream are accompanied by bit synchronizing pulses, said bit streams having a number of different characteristic bit recurrence rates;

a plurality of output lines for conveying pulse data signals of various different kinds including:
- a first plurality of output lines for conveying pulse telegraph signals, arranged in a start-stop format, at a number of different intelligence element recurrence rates; and
- a second plurality of output lines for conveying binary pulse data signals arranged in the form of uninterrupted streams of signal bits in which the individual bits of each stream are accompanied by bit synchronizing pulses, said bit streams having a number of different characteristic bit recurrence rates;

a magnetic core matrix memory unit containing a plural core assembly-disassembly cell corresponding to each said line and a plurality of plural cell auxiliary storage bins for storing complete messages;

means for periodicaly scanning said lines together with the said corresponding assembly-disassembly memory cells in a predetermined multiplex sequence in which the time allotted to the scanning of any cell is variable and in which the overall scan period is a common integral divisor of the duration of all telegraph pulse intelligence elements carried on said lines, said period being shorter in duration than the shortest duration intelligence bit appearing on any input or output line in said second pluralities of lines;

an assembly-disassembly register;

means effective in alternate cycles of said scanning means for shuttling stored intelligence from each said corresponding assembly-disassembly cell to said register and back again to said cell during each step of said scanning means;

first means operated in step with said intelligence shuttling means for examining the said stored intelligence in said register during each said scanning step for timing and control information peculiar to the line being scanned during said step;

second means operated under the control of said examining means for examining a signal bit present on the said line being scanned and for selectively transferring a corresponding signal bit between said line and a predetermined stage of said register in accordance with said examined timing and control information;

means coupled to said first and second examining means for modifying said stored timing and control information upon the occurrence of a selective transfer of a signal bit between a scanned line and said register;

means coupled to said register for examining the signal bits undergoing transfer between each line and said register in predetermined plural bit character groups and for modifying the digital state of a plurality of bits of said control information in accordance with a special character sequence in said examined character groups;

means coupled to said register for transferring signal bits in character groups between said register and predetermined cells in selectively assigned auxiliary bins in said memory unit; and program controlled central processing means effective alternately with said shuttling means for storing address information in said assembly-disassembly cells, designating the address assignment of an auxiliary bin when the said digital state of said control information bits indicates the commencement of transmission of a message on an input line or of the availability of an output line for retransmission of a message, and for processing messages completely assembled in said assigned bins in order to route said messages to appropriate assembly cells representing output line destinations specified in the texts of said messages.

References Cited

UNITED STATES PATENTS 3,229,259 1/1966 Barker et al. _____ 179—15
3,300,763 1/1967 Hoehmann _____ 179—15

JOHN W. CALDWELL, *Primary Examiner.*

DAVID G. REDINBAUGH, *Examiner.*

J. T. STRATMAN, *Assistant Examiner.*